UNITED STATES PATENT OFFICE.

ARTHUR BARBARIN, OF NEW ORLEANS, LOUISIANA.

IMPROVED BOTTLE-STOPPER.

Specification forming part of Letters Patent No. 56,516, dated July 24, 1866.

*To all whom it may concern:*

Be it known that I, ARTHUR BARBARIN, of New Orleans, in the parish of Orleans and State of Louisiana, have invented certain new and useful Improvements in the Method of Stopping Bottles; and I hereby declare the following to be a full, clear, and exact description of the same, reference being had to the accompanying drawings.

The nature of my invention consists in the employment, in connection with the cork or other bottle-stopper, of a rubber fastening device, by means of which the stopper is held firmly in the bottle. This fastening device may consist of a disk of thin rubber with a ring of thicker rubber around its periphery, the said ring being smaller than the neck of the bottle to be corked. After the bottle has been corked the disk of rubber is stretched over the cork, and the ring or holder, when drawn down, being smaller than the neck of the bottle, is secured under the flange on the neck, which it pinches firmly. This rubber fastening will thus take the place of the kid or other leather covering now used with bottle-stoppers, and may be used to much greater advantage than the leather, as it is waterproof and resists much better the action of the acids with which the bottle may be filled. At the same time it may be so formed as to hermetically seal the bottle and to prevent all evaporation of its contents.

In connection with the rubber disk or holder a rubber cork may be used, and the disk may be cemented to the top of the cork, the cork and holder thus constituting one device.

Instead of a disk of rubber, one or more rubber strips of suitable size may be attached to the ring if it is not desired to completely cover the cork, and the ring may be secured under the flange on the neck of the bottle, as before, the strips being stretched over and holding firmly the cork. This latter arrangement of the device can, however, be only used when there is a stopper to the bottle; but when the rubber disk is employed it may be stretched over the mouth of the bottle when uncorked, and will thus form a temporary stopper which will close the bottle and prevent the evaporation of its contents.

By reference to the drawings accompanying this specification the nature of my invention will be fully understood.

Figure 1 is a section, and Fig. 2 a plan view, of the rubber holder first mentioned above.

A is a disk of thin rubber, around the outer edge of which is a ring, $b$, of thicker rubber, which should be smaller than the neck of the bottle to be corked. When the device is put in use the cork C, Fig. 3, is first inserted in the neck of the bottle. The disk $a$ is then placed on top of the cork and its edges drawn down until the ring $b$ is secured under the flange on the neck, which it pinches firmly.

The cork may be either separate from the fastening device, or, which is perhaps preferable, it may be secured to the disk, so that all the parts shall form one device, as shown in section in Fig. 4 and in plan in Fig. 5, $b$ being the ring around the edge of the disk $a$, to which latter the cork $c$ is cemented.

Instead of the rubber disk, one or more strips of rubber may be used for the same purpose, as shown in Figs. 6, 7, and 8. The bottle is first stopped with the cork $c$, and then the device, composed in this instance of one rubber strip, $d$, secured by each end to the ring $b$, is applied, the ring $b$ being drawn down until it clasps tightly the flange on the neck of the bottle. The strip or rubber strand $d$ is thus made to hold the cork firmly and to press it into place.

In Fig. 6 the ring and strip are represented in a distended condition, as they appear when applied to the bottle shown in Figs. 7 and 8. Instead of the one strip seen in the last-mentioned figures, two or three, or as many as are deemed necessary, may be employed, all of them being held in place by means of the rubber ring $d$ or equivalent fastening device.

I do not mean to limit myself to the precise arrangement or form of device shown in the drawings, for the size, shape, &c., may be varied to suit the stopper and bottle, jar, or other receptacle to which it is to be applied. The rubber disk may have more of a bag shape, and the ring $b$, by which it is secured in position, may be of any form, thickness, or size, or equivalent elastic material.

J. N. BAXTER.
Horse Rake.
No. 56,517.
Patented July 24, 1866.
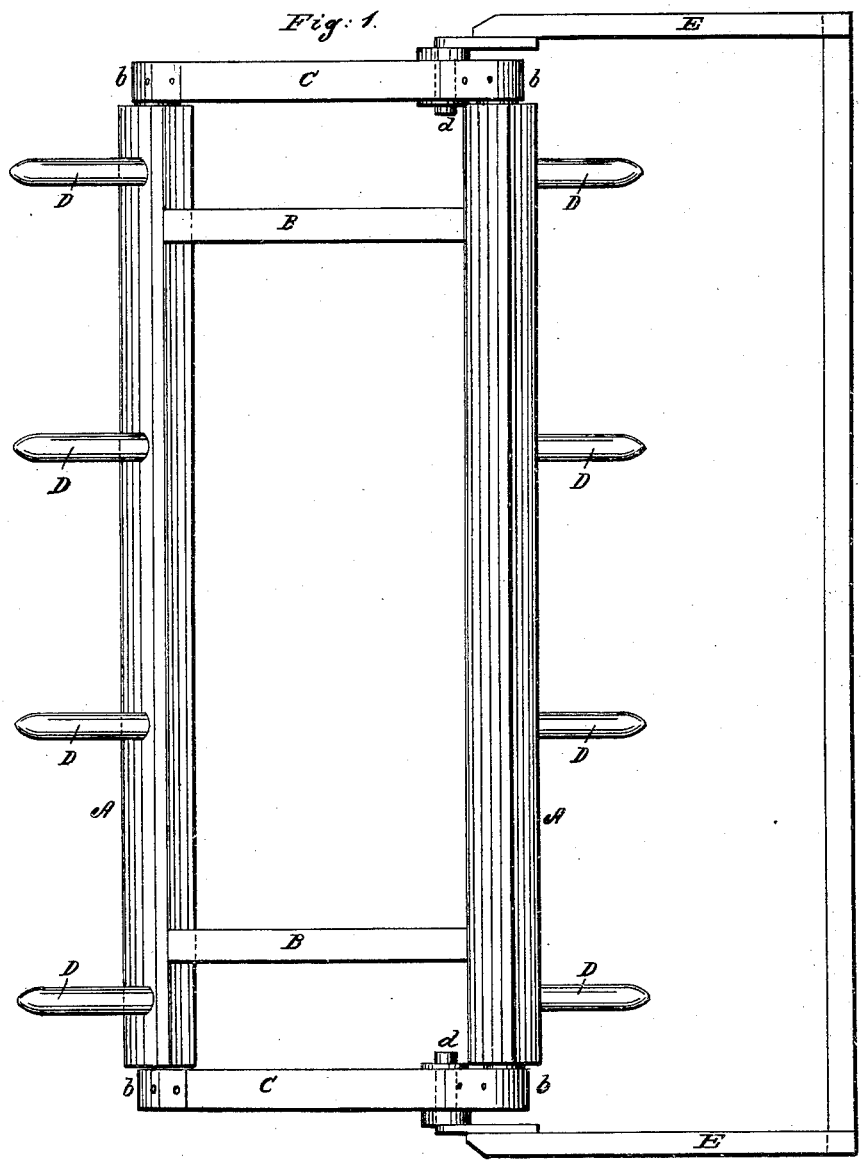
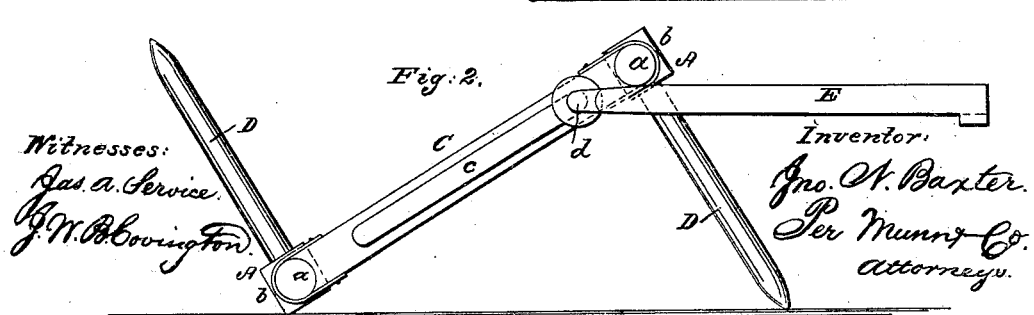

Having thus described my invention, what